United States Patent [19]

Harara et al.

[11] Patent Number: 4,903,982
[45] Date of Patent: Feb. 27, 1990

[54] SUSPENSION CONTROL APPARATUS AND METHOD FOR A VEHICLE

[75] Inventors: Mitsuhiko Harara; Shozo Takizawa; Tadao Tanaka, all of Okazaki; Shunichi Wada, Himeji, all of Japan

[73] Assignee: Mitsubishi Denki Kabushiki Kaisha, Tokyo, Japan

[21] Appl. No.: 267,871

[22] Filed: Nov. 7, 1988

[30] Foreign Application Priority Data

Nov. 5, 1987 [JP] Japan ............................ 62-169216[U]

[51] Int. Cl.⁴ .............................................. B60G 17/00
[52] U.S. Cl. ...................................... 280/707; 240/804
[58] Field of Search ............... 280/707, 709, 711, 708, 280/804; 180/41

[56] References Cited

U.S. PATENT DOCUMENTS

| 4,722,547 | 2/1988 | Kishi et al. | 280/707 |
| 4,765,648 | 8/1988 | Mander et al. | 280/707 |
| 4,797,823 | 1/1989 | Ikemoto et al. | 280/807 |

FOREIGN PATENT DOCUMENTS

| 0142947 | 5/1985 | European Pat. Off. |
| 61-163710 | 10/1986 | Japan |
| 62-234808 | 2/1987 | Japan |

Primary Examiner—Richard A. Bertsch
Attorney, Agent, or Firm—Sughrue, Mion, Zinn, Macpeak & Seas

[57] ABSTRACT

A suspension control apparatus and a method for a vehicle having a plurality of suspension units each disposed between a road wheel and the body of a vehicle for suspending the corresponding road wheel from the vehicle body. The suspension control apparatus includes a control unit which is connected to receive the output signals from an acceleration sensor, a vehicle-speed sensor and a steering sensor for calculating the rolling state of the vehicle due to a transverse acceleration thereof and controlling the respective suspension units based on the calculated rolling state of the vehicle so as to suppress the rolling thereof. The control unit serves to determine the period or frequency of change or reversal of the direction of the detected transverse acceleration of the vehicle, and control the suspension units so as to stop the roll-suppression control when the frequency of reversal exceeds a prescribed level. The control unit further performs the first roll-suppression control operation and stop subsequent roll-suppression control operations from the instant when the frequency of reversal of the direction of the transverse acceleration exceeds the prescribed level.

4 Claims, 4 Drawing Sheets

LEFT TURN     NEUTRAL     RIGHT TURN

SUSPENSION CONTROL APPARATUS AND METHOD FOR A VEHICLE

BACKGROUND OF THE INVENTION

1. Field of the Invention

The present invention relates generally to a vehicular suspension system and, more particularly, to a suspension control apparatus and method for controlling the operation of such a suspension system so as to suppress rolling and nose diving of a vehicle in response to an output signal from an acceleration sensor representative of a lateral or transverse acceleration of the vehicle.

2. Description of the Related Art

In the past, many suspension control apparatus of this type have been known, some examples of which are disclosed in Japanese Utility Model Laid-Open No. 61-163710 or Japanese Patent Laid-Open No. 62-34808. In these conventional suspension control apparatus, a fluid spring chamber such as a pneumatic spring chamber is interposed between each road wheel and the body of a vehicle so that supply to and discharge from the fluid spring chamber of compressed air is controlled in an appropriate manner to suppress rolling or nose diving of the vehicle body. Specifically, there is a tendency that when a vehicle is steered to turn, the suspension units disposed on the turning side of the vehicle are forced to contract under the action of centrifugal force whereas those on the opposite side thereof expand. In order to suppress this tendency, a predetermined amount of compressed air is supplied to the fluid spring chamber of each of the suspension units on the contracted side, and at the same time a predetermined amount of pressure air is discharged from the fluid spring chamber of each of the suspension units on the expanded side so as to incline the vehicle body in the opposite direction, thereby maintaining the attitude of the vehicle body in a horizontal manner.

To this end, the rolling condition such as the magnitude and direction of rolling of the vehicle body is detected by an acceleration sensor such as a G sensor in such a manner that the magnitude and direction of the rolling are determined according to a deviation in the right or left direction from a neutral point (i.e., the point of 0 G) of a sensing member of the acceleration sensor, and a control unit such as a microcomputer stores quantities of control parameters which correspond to the rolling condition thus detected and performs roll control based on the stored control quantities, In this case, however, if the direction of the transverse acceleration changes from the right to the left or vice versa in a short period of time, there will be the following drawbacks; no proper roll control can be effected due to time lags in controlling operation; and the suspension, thus resulting in deterioration in the durability thereof.

Moreover, if roll control is suddenly stopped in the presence of a variation in frequency of the change of direction of the transverse acceleration greater than a prescribed frequency level, there will be a possibility of losing proper roll controlling capability when the vehicle is steered to make a lane change or abrupt turn in emergency situations.

SUMMARY OF THE INVENTION

Accordingly, the present invention is intended to overcome the above described drawbacks encountered in the conventional suspension control apparatus.

It is an object of the present invention to provide a suspension control apparatus and method for a vehicle which is capable of suppressing unstable operation of the vehicle resulting from time lags in roll controlling while preventing unnecessary or useless operation of suspension units to improve its durability, and properly perform any necessary or required operation such as a lane change, an emergency turn or the like.

In order to achieve the above object, in accordance with one aspect of the present invention, there is provided a suspension control apparatus for a vehicle comprising:

a plurality of suspension units each disposed between a road wheel and the body of a vehicle for suspending the corresponding road wheel from the vehicle body;

an acceleration sensor sensing a transverse acceleration of the vehicle and providing an output signal which is representative of the sensed transverse acceleration;

a vehicle-speed sensor sensing the speed of the vehicle and providing an output signal representative of the sensed vehicle speed;

a steering sensor sensing the steering condition of the vehicle and providing an output signal representative of the sensed steering condition; and control means connected to receive the output signals from the acceleration sensor, the vehicle-speed sensor and the steering sensor for calculating the rolling state of the vehicle due to the transverse acceleration thereof and actively controlling the respective suspension units based on the calculated rolling state of the vehicle so as to suppress the rolling thereof, the control means serving to determine the frequency of change in the direction of the detected transverse acceleration of the vehicle and control the suspension units so as to stop the roll-suppression control when the frequency of change exceeds a prescribed level.

Preferably, the control unit serves to perform the first roll-suppression control operation and stop subsequent roll-suppression control operations from the instant when the frequency of change in the direction of the transverse acceleration exceeds the prescribed level.

In accordance with another aspect of the present invention, there is provided a suspension control method for a vehicle having a plurality of suspension units each disposed between a road wheel and the body of a vehicle for suspending the corresponding road wheel from the vehicle body, the suspension control method comprising the steps of:

sensing a transverse acceleration of the vehicle;
sensing a speed of the vehicle;
sensing a steering condition of the vehicle; and
calculating a rolling state of the vehicle due to the sensed transverse acceleration thereof and actively controlling the respective suspension units based on the calculated rolling state of the vehicle so as to suppress the rolling thereof; and
determining the frequency of change in the direction of the detected transverse acceleration of the vehicle and controlling the suspension units so as to stop the roll-suppression control when the frequency of change exceeds a prescribed level.

Preferably, the step of determining the frequency of change in the direction of the detected transverse acceleration of the vehicle and controlling the suspension units comprises performing the first roll-suppression control operation and stopping subsequent roll-suppression control operations from the instant when the frequency of change in the direction of the transverse acceleration exceeds the prescribed level.

The above and other objects, features and advantages of the present invention will become more apparent from the following detailed description of a preferred embodiment of the invention when taken in conjunction with the accompanying drawings.

DESCRIPTION OF THE PREFERRED EMBODIMENT

The present invention will now be described in detail, by way of example, with reference to the accompanying drawings.

Figure 1:
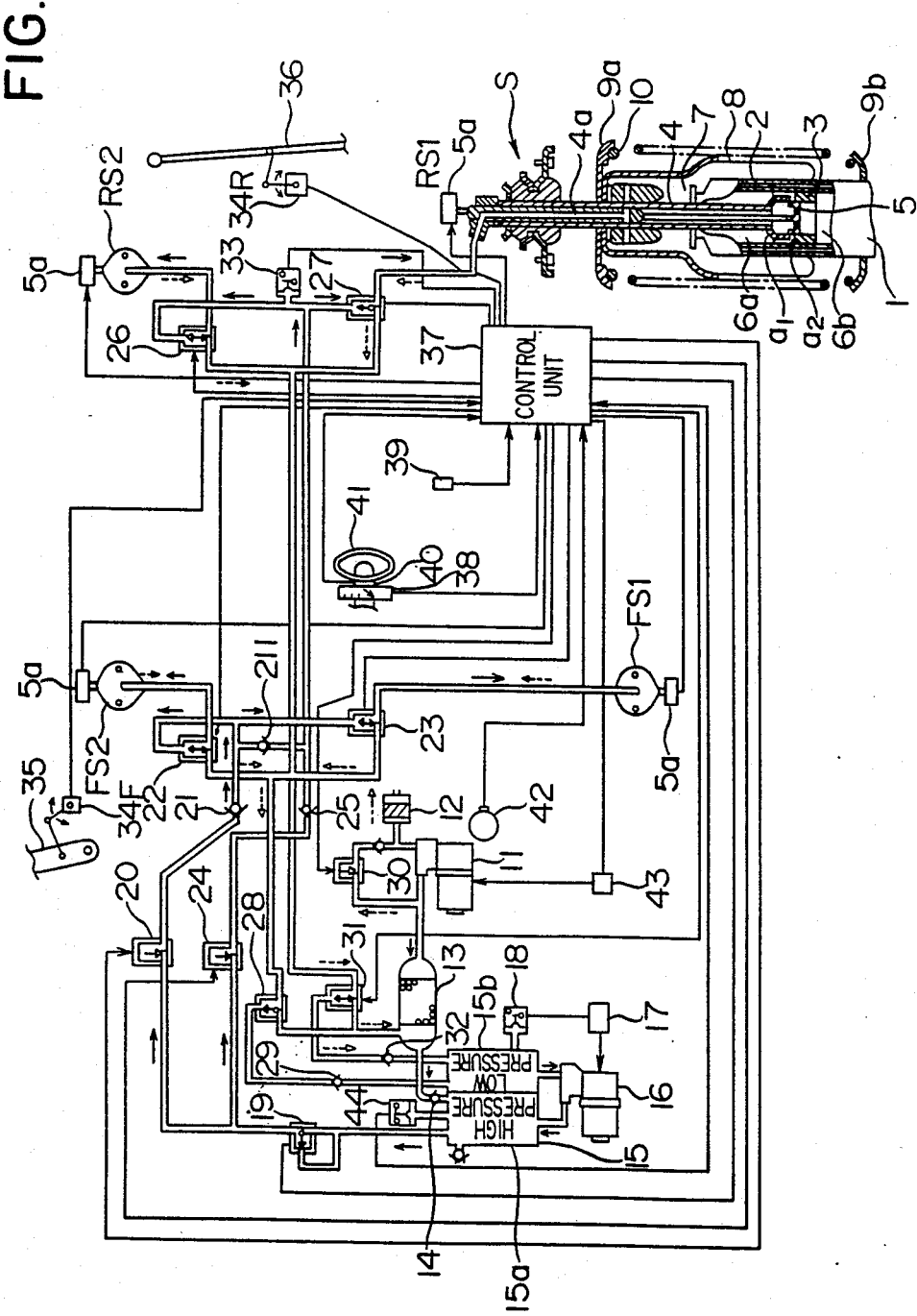
FIG. 1 is a circuit diagram showing the construction of a suspension control apparatus for a vehicle in accordance with the present invention.
Figure 2:
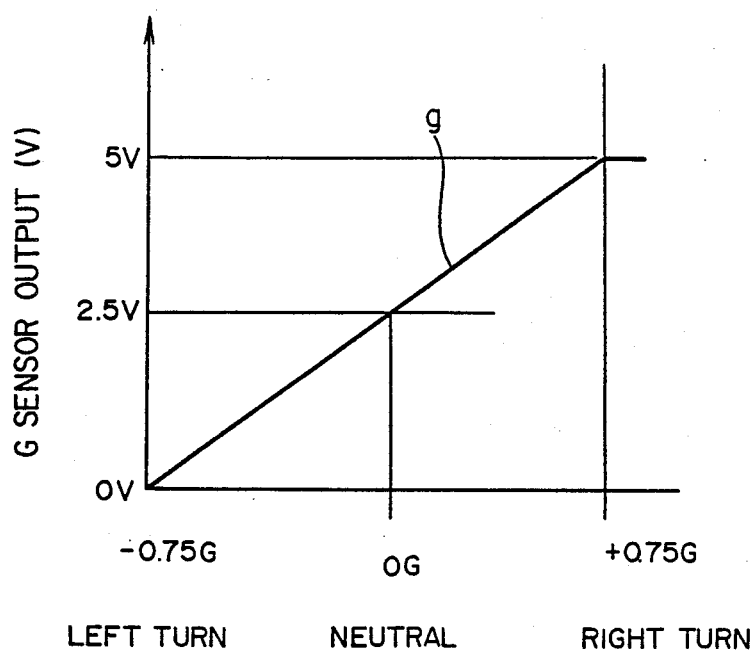
FIG. 2 is a graphic representation showing the output voltage characteristics of a G sensor employed in the suspension control apparatus of FIG. 1.

Referring first to FIG. 1, there is illustrated the general arrangement of a suspension control apparatus in accordance with the invention which includes two front fluid suspension units FS1, FS2 for the unillustrated right and left front wheels of a vehicle and two rear fluid suspension units RS1, RS2 for the unillustrated right and left rear wheels. All suspension units have substantially the same construction, so except when the front and rear suspension units are specifically distinguished, hereinbelow the suspension units will be referred to simply by the letter S. In the illustrated example, each of the fluid suspension units FS1, FS2, RS1 and RS2 comprises an air suspension unit.

Each of the air suspension units S has a strut-type shock absorber 1 incorporated therein which comprises a cylinder 2 mounted on a front (or rear) wheel of a vehicle and a piston 3 which is slidably inserted in the cylinder 2 to define therein a first chamber 6a and a second chamber 6b on the opposite sides thereof. The piston 3 is fixedly connected with a piston rod 4 at its one end so that as the road wheels of the vehicle are caused to move up and down following road surface irregularities, the cylinder 2 is forced to vertically move with respect to the piston rod 3 so as to effectively absorb or alleviate shocks which are to be transmitted from a road surface to the body of the vehicle which is traveling thereon.

A change-over valve 5 is provided on the piston 3 for changing the damping force of each shock absorber 1.

The change-over valve 5 is operatively connected with an actuator 5a so that it is selectively rotated by the actuator 5a to a first position in which the first and second chambers 6a and 6b defined in the cylinder 1 on the opposite sides of the piston 3 are placed in fluid communication with each other through first orifices a1 alone to make the shock absorber 1 in a hard-cushioning mode or to a second position in which the first and second chambers 6a and 6b are placed in fluid communication with each other through first and second orifices a1 and a2 to provide a soft-cushioning mode. The operation of the actuator 5a is controlled by a control unit 37 which will be described later.

Disposed on the upper portion of the shock absorber 1 in a coaxial relation with the piston rod 4 is a primary pneumatic spring chamber 7 which acts as a vehicle-height adjusting means. The primary pneumatic spring chamber 7, a portion of which is constituted by a bellows 8, is in fluid communication with an axial passage 4a which is formed in the piston rod 4 so that air can be supplied to or discharged from the primary pneumatic spring chamber 7 through the axial passage 4a, thereby permitting the vertical movement of the piston rod 4 relative to the cylinder 1.

A first downwardly directed spring retainer 9a is mounted on the top of the primary pneumatic spring chamber 7 and a second upwardly directed spring retainer 9b is provided on the outer peripheral surface of the shock absorber 1 with a coiled spring 10 being disposed under compression between these first and second spring retainers 9a and 9b for biasing the cylinder 2 of the shock absorber 1 downwardly in a direction away from the primary pneumatic spring chamber 7.

A compressor 11 is provided for compressing atmospheric air fed therein through an air cleaner 12 and for supplying the thus compressed air to a dryer 13 wherein the air from the compressor 11 is dried by drying means or agent such as silica gel and fed via a check valve 14 to a high pressure tank 15a of a reservoir 15 and stored therein. The reservoir 15 also has a low pressure tank 15b. These reservoir tanks 15a and 15b are connected with each other through a compressor 16 which is adapted to be driven to operate through a compressor relay 17. A pressure switch 18 is provided which is turned on to drive the compressor relay 17 when the pressure in the low pressure tank 15b increases above the atmospheric pressure, so that the compressor 16 is driven to suck air from the tank 15b and supply compressed air to the tank 15a, thereby always maintaining the tank 15b at a subatmospheric pressure.

The compressed air in the high pressure tank 15a is supplied to the respective suspension units FS1, FS2, RS1 and RS2 through distribution piping, as shown in FIG. 1 by arrows in solid lines. For example, compressed air is supplied from the high pressure tank 15a to the front suspension units FS1 and FS2 through a flow control valve 19 in the form of a three-way valve, a front air-supply solenoid valve 20 in the form of an on/off valve, a check valve 21, and a front right-side solenoid valve 22 or a front left-side solenoid valve 23. Similarly, compressed air is supplied from the high pressure tank 15a to the rear suspension units RS1 and RS2 through the flow control valve 19, a rear air supply solenoid valve 24, a check valve 25, and a rear right-side solenoid valve 26 or a rear left-side solenoid valve 27. The portion of the distribution piping downstream of the check valve 21 is connected with the piping portion downstream of the check valve 25 through a conduit having a check valve 211 therein. On the other hand, air is discharged from the respective suspension units FS1, FS2, RS1 and RS2 to the outside atmosphere through the discharge paths as shown in FIG. 1 by arrows in broken lines. That is, air is first led from the front suspension units FS1 and FS2 to the low pressure tank 15b through the solenoid valves 22 and 23, a front discharge valve 28, and a pressure reserving valve 29, and then discharged from the low pressure tank 15b to the outside atmosphere through the solenoid valves 22 and 23, a front discharge valve 28, the dryer 13, a discharge solenoid valve 30, and the air cleaner 12. Likewise, air in the rear suspension units RS1 and RS2 is first led to the low pressure tank 15b through the rear solenoid valves 26 and 27, a rear discharge valve 31, and a rear pressure reserving valve 32, and then discharged from the low pressure tank 15b to the outside atmosphere through the rear solenoid valves 26 and 27, a rear discharge valve 31, the dryer 13, the discharge solenoid valve 30, and the air cleaner 12.

In this connection, it is to be noted that if the pressure in the low pressure tank 15b of the reservoir 15 is lower than the pressure in the primary pneumatic spring chambers 7, the pressure reserving valves 29 and 32 are opened, whereas if the pressure in the low pressure tank 15b is equal to or higher than the pressure in the primary pneumatic spring chambers 7, the pressure reserving valves 29 and 32 are closed. The first and second rear pneumatic spring chambers 7 are in fluid communication with each other through a communication passage having a pressure switch 33 which sends an output signal to the control unit 37.

A vehicle-height sensing means is provided for sensing the height of the vehicle, and comprises a front vehicle-height sensor 34F mounted on a lower arm 35 of the front second (or right-side) suspension unit FS2 for sensing the height of the front portion of the vehicle, and a rear vehicle-height sensor 34R mounted on a lateral rod 36 of the rear first (left-side) suspension unit RS1 for sensing the height of the rear portion of the vehicle. Each of these sensors 34F and 34R is designed to sense the distance between the present vehicle height and a preset normal height level, and the distance between the present vehicle height and a preset low or high height level, and sends out two output signals representative of the distances as sensed in the above manner to the control unit 37.

In this connection, it is to be noted that a difference in the vehicle height between the front right-side portion and the rear left-side portion which lie on a diagonal line represents, after adjustment of the vehicle height in the longitudinal direction has been made, an inclination in the transverse direction of the vehicle body. Thus, by means of the vehicle-height sensors 34F and 34R, it is possible to sense whether or not the vehicle body is level or horizontal. In this manner, it is possible to indirectly sense an inclination of the vehicle body due to the steering operation of an operator.

A speed sensor 38 is incorporated in a speedometer for sensing the traveling speed of the vehicle. The speed sensor 38 sends an output signal representative of the vehicle speed thus sensed to the control unit 37.

For the purpose of sensing a change in the attitude of the vehicle, there is provided a vehicle-attitude sensor 39 which is, in the illustrated embodiment, an acceleration sensor in the form of a differential transformer type G sensor (hereinafter simply referred to as a G sensor) for example. The G sensor 39 has characteristics in which the output voltage of the sensor 39 is 2.5 V at a neutral point of 0 G when the vehicle runs straight, increases therefrom when the vehicle is steered to make a righthand turn and decreases therefrom when the vehicle is steered to make a lefthand turn. The output voltage of the G sensor 39 differentiated by time is in proportion to the angular velocity of a steering wheel 41.

Also provided are a steering sensor 40 for sensing the rotational speed or steering of the steering wheel 41 and an accelerator pedal sensor 42 for sensing the amount or angle of depression imparted to an unillustrated accelerator pedal by the operator The output signals of the steering sensor 40 and the accelerator pedal sensor 42 representative of the sensed steering speed and the sensed accelerator pedal depression amount or angle are fed to the control unit 37.

Figure 3A:
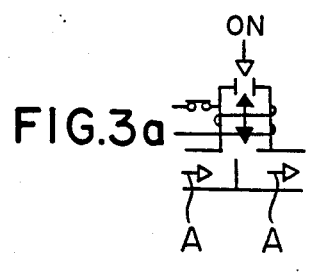
FIGS. 3a and 3b are schematic illustrations showing the operative (turn-on) condition and the inoperative (turn-off) condition, respectively, of a three-way solenoid valve employed in the suspension control apparatus of FIG. 1.
Figure 4A:
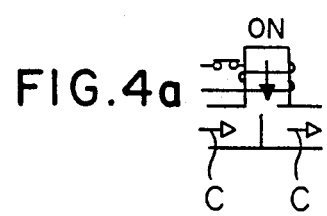
FIGS. 4a and 4b are schematic illustrations showing the operative (turn-on) condition and the inoperative (turn-off) condition, respectively, of an on/off solenoid valve employed in the suspension control apparatus of FIG. 1.
Figure 3B:
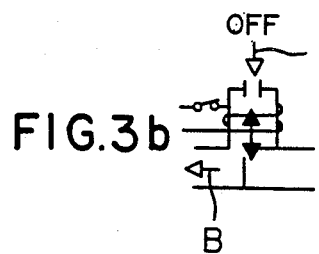
Figure 4B:
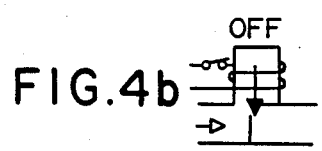

A compressor relay 43 for driving the compressor 11 is provided which is controlled by a control signal from the control unit 37. A pressure switch 44 is provided which is turned on when the pressure in the high-pressure reservoir tank 15a decreases below a predetermined value. The pressure switch 44, when turned on, sends an output signal to the control unit 37 so that the compressor relay 43 is actuated by a control signal from the control unit 37 to drive the compressor 11. By the operation of the compressor 11, compressed air is delivered to the high-pressure reservoir tank 15a until the pressure in the tank 15a rises above a predetermined level. In this regard, it should be noted that the opening and closing operations of the solenoid valves 20, 22, 23, 24, 26, 27 and 30 and the valves 19, 28 and 31 are effected by control signals from the control unit 37. Each of the solenoid valves 22, 23, 26 and 27 and the valves 19, 28 and 31 comprises a three-way valve which takes two different positions as illustrated in FIGS. 3a and 3b. FIG. 3a shows a first or operative position in which the three-way valve is turned on or driven to operate so that compressed air flows in the directions as indicated by arrows A with white triangular heads. On the other hand, FIG. 3b shows a second or inoperative position in which the three-way valve is turned off or not driven so that compressed air flows through the valve in the directions as indicated by arrows B with white triangular heads. Further, each of the solenoid valves 20, 24 and 30 comprises a two-way or on/off valve which takes two positions as illustrated in FIGS. 4a and 4b. FIG. 4a shows a first or operative position in which the two-way valve is turned on to open so that compressed air flows in the directions as indicated by arrows C with white triangular heads. On the other hand, FIG. 4b shows a second or inoperative position in which the two-way valve is turned off to close so that the flow of compressed air is stopped.

Figure 5:
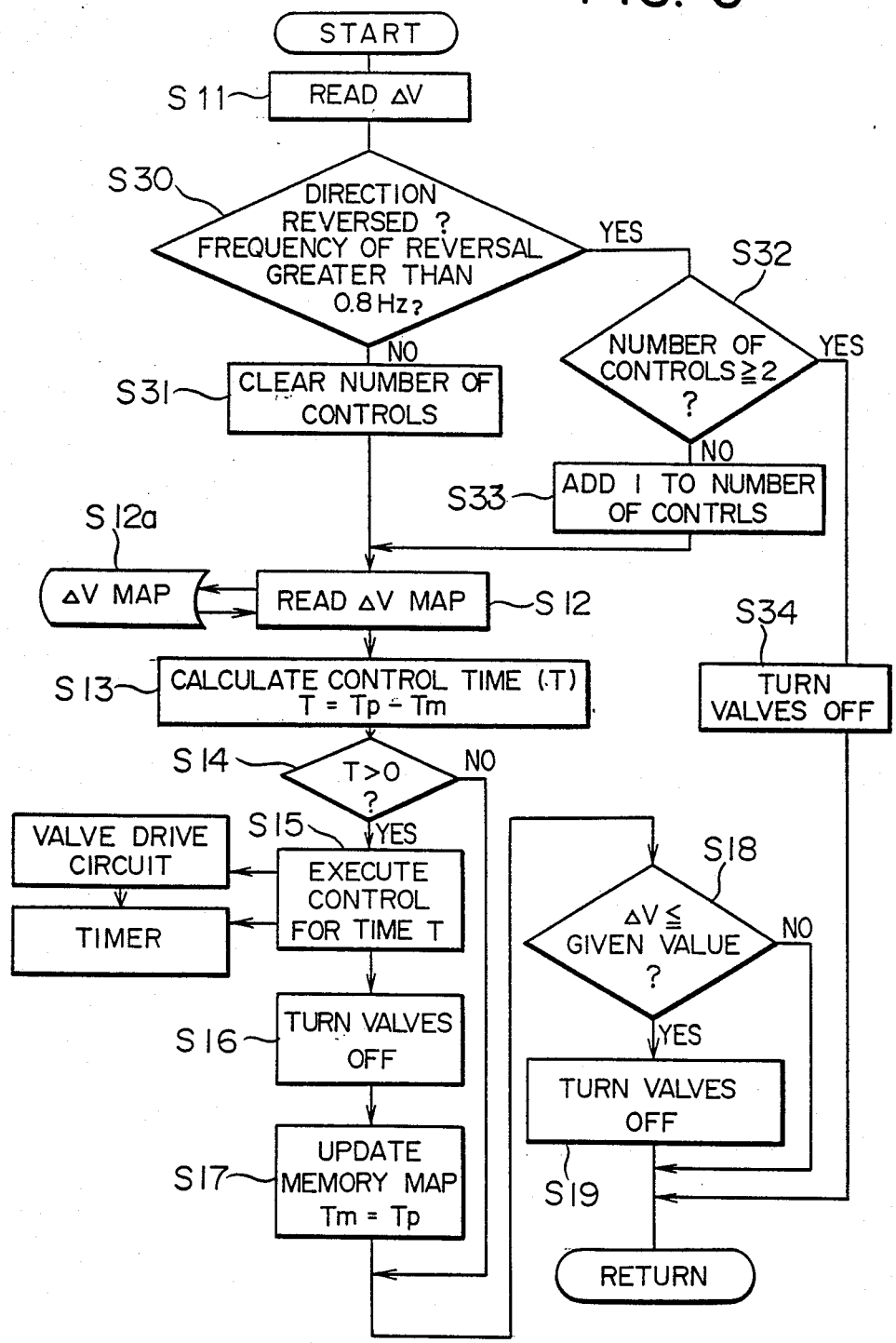
FIG. 5 is a flow chart showing the roll-suppressing operation of the suspension control apparatus of FIG. 1.

Now, the roll-suppressing operation of the suspension control apparatus as constructed above will be described while referring to the flow chart of FIG. 5.

First in Step S11, the control unit 37 reads out the output voltage $V_1$ of the G sensor 39 and calculates a deviation $\Delta V$ of the output voltage $V_1$ from the neutral point $V_o$ which is 2.5 V; i.e., $\Delta V = V = 2.5$. In this regard, it is to be noted that $\Delta V > 0$ represents a leftward acceleration and $\Delta V < 0$ a rightward acceleration. Then in Step S30, the control unit 37 determines whether the direction of the transverse acceleration is changed or reversed and whether the deviation AV is greater than a prescribed control judging value. If it is determined that the direction of acceleration has been reversed, then it is further determined whether the period (i.e., frequency) of change or reversal of the direction is greater than 0.8 Hz. In this case, if it is less than 0.8 Hz, i.e., the change or reversal of direction of the transverse acceleration is relatively slow, the control process proceeds to Step S31 where the number of roll-controlling operations, which have been effected when the frequency of reversal is greater than 0.8 Hz, is cleared to 0. Thereafter, the process proceeds to Step S12.

On the other hand, if it is determined in Step S30 that the frequency of reversal is greater than 0.8 Hz, the control process proceeds from Step S30 to Step S32 where it is further determined whether the number of roll-controlling operations as effected when the frequency of reversal is greater than 0.8 Hz is equal to or greater than 2. If it is equal to or greater than 2, the control process proceeds to Step S34 where subsequent roll-controlling operations are prohibited. From Step S34, the control process returns to the start, i.e., Step S11. In this case, though the roll control is prohibited, the damping force of each of the suspension units S can be changed, and fluid communication between the right and left pneumatic spring chambers can be controllably blocked, as indicated by numeral 6 in the following Table 1.

Figure 6:
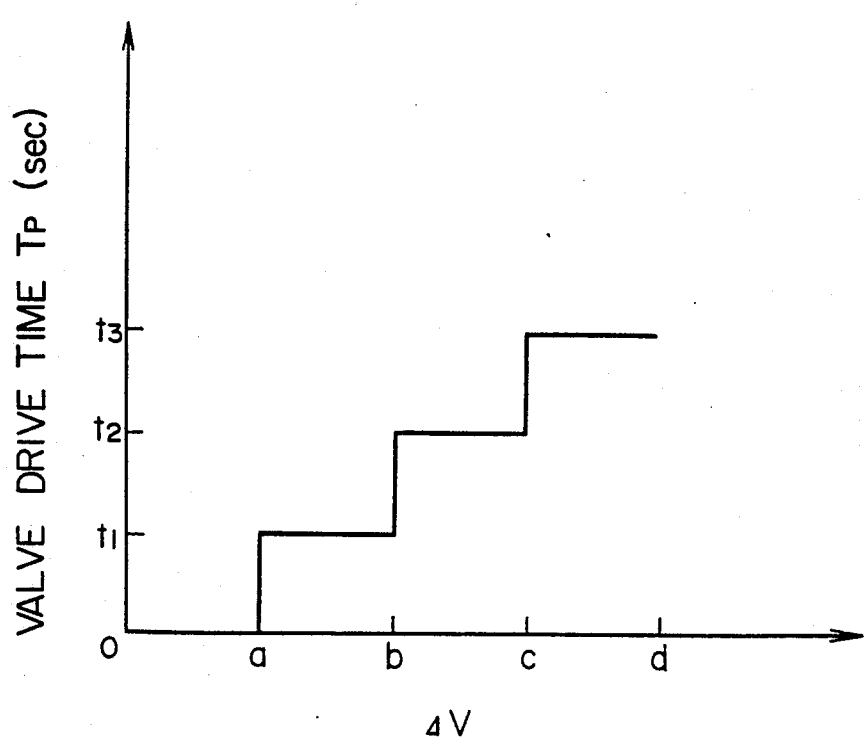
FIG. 6 is a graphic representation showing the relationship between a valve drive time $T_p$ and a deviation $\Delta V$ from a neutral point of the G sensor.

Turning now to Step S12, the AV map, as illustrated in FIG. 6, which is stored in the control unit 37, is referred to so as to calculate an appropriate valve drive time $T_p$ which corresponds to the calculated deviation $\Delta V$ of the G sensor output voltage $V_1$. In Step S13, a control time or duration T is calculated by the following formula;

$$T = T_p - T_m$$

where $T_m$ represents a period of time for which the related valves were already driven to operate or open and which is stored in the memory map. Accordingly, if the control process proceeds to Step S13 for the first time, $T_m$ is zero and T is equal to $T_p$.

Subsequently in Step S14, it is determined whether T is greater than zero (T>0). If it is determined that T is greater than zero (T>0), then in Step S15 valve control is effected for a time duration of T. In this case, which valves are driven to open is indicated in the following Table.

TABLE

| | | Front Air Supply Valve (20) | Rear Air Supply Valve (24) | Front Air Discharge Valve (28) | Rear Air Discharge Valve (31) | Air Supply Flow Control Valve (19) | Air Discharge Solenoid Valve (30) | Front Right Solenoid Valve (22) | Front Left Solenoid Valve (23) | Rear Right Solenoid Valve (26) | Rear Left Solenoid Valve (27) |
|---|---|---|---|---|---|---|---|---|---|---|---|
| (1) Roll Control | Right Turn Start | o | o | x | x | x | x | o | x | o | x |
| | Right Turn Maintain | x | x | o | o | x | x | o | x | o | x |
| | Right Turn Release | x | x | x | x | x | x | x | o | x | o |
| | Left Turn Start | o | o | x | x | x | x | x | o | x | o |
| | Left Turn Maintain | x | x | o | o | x | x | x | o | x | o |
| | Left Turn Release | x | x | x | x | x | x | o | x | o | x |
| (2) Nose-Dive Control | Start | o | o | x | x | x | x | x | x | x | x |
| | Maintain | x | x | o | o | x | x | x | x | x | x |
| | Restore | x | o | x | x | x | x | o | o | x | x |
| (3) Squat Control | Start | x | o | x | x | x | x | x | x | x | x |
| | Maintain | x | x | x | x | x | x | x | x | x | x |
| | Restore | o | x | x | x | x | x | x | x | o | o |
| (4) Vehicle Height Control (Normal) | Raise | o | o | x | x | x | x | x | x | x | x |
| | Lower | x | x | o | o | x | o | o | o | o | o |
| (5) Rapid Vehicle Height Control | Raise | o | o | x | x | x | x | x | x | x | x |
| (6) Left-Right Connection Closing | Maintain | x | x | o | o | x | x | o | x | o | x |

For example, in the case of a rightward turn (i.e., $\Delta V > 0$), there is a tendency that the vehicle body is raised at the right side and lowered at the left side. In order to suppress this tendency, valves marked by 0 are driven to open for the control time T so that compressed air in the high-pressure reservoir tank 15a is supplied to the primary pneumatic spring chambers 7 of the front and rear left-side suspension units FS1 and RS1 via the flow control valve 19, the front and rear supply valves 20 and 24, the solenoid valves 23 and 27, thereby biasing the vehicle body in a direction to rise at the left side thereof.

On the other hand, compressed air in the primary pneumatic spring chambers 7 of the front and rear right-side suspension units FS2 and RS2 is discharged to the low-pressure reservoir tank 15b via the front and rear discharge valves 28 and 31, thus biasing the vehicle body in a direction to lower at the right side thereof. In this manner, the tendency of the vehicle body to be transversely inclined by centrifugal force during a rightward turn of the vehicle is effectively suppressed.

After the control time T is up, the control process proceeds to Step S16 in which the front supply valve 20 and the rear supply valve 24 are turned off to close so that the supply of compressed air to the primary pneumatic spring chambers 7 of the front and rear left-side suspension units FS1 and RS1 is stopped. At the same time, the front and rear discharge valves 28 and 31 are turned on to stop the discharge of compressed air from the primary pneumatic spring chambers 7 of the front and rear right-side suspension units FS2 and RS2. As a result, the attitude of the vehicle body as adjusted above is maintained.

Subsequently in Step S17, the map memory stored in the control unit 37 is updated. That is, the period of time $T_p$ for which the related valves were driven to open is freshly stored as $T_m$ in the control unit 37 ($T_m = T_p$).

Thereafter in Step S18, it is determined whether $\Delta V$ is not greater than a given value. If $\Delta V$ is greater than the given value during a turning movement of the vehicle for example, the next step S19 of stopping the attitude control is skipped and the control process returns from Step S18 to the first Step S11.

On the other hand, in Step S18, if it is determined that $\Delta V$ is not greater than the given value, the control process proceeds to Step S19 wherein the related valves are all turned off to remove or stop the attitude control performed in Step S16. Thereafter, the control process returns from Step S19 to the first Step 11, and a new valve drive time $T_p$ is calculated by the use of the now updated $\Delta V$ map in Step S12.

Although in the above embodiment, the roll-suppressing control is effected based on $\Delta V$ alone, it is possible to perform such a roll-suppressing control on the basis of a valve drive time $T_p$ which is calculated based on the direction (i.e., rightward or leftward) of $\Delta V$, the vehicle speed sensed by the speed sensor 38 and the angular velocity of the steering wheel 41 sensed by the steering sensor 40 using a different map stored in the control unit 37. In this case, the step of calculating such a valve control time $T_p$ corresponds to Step S12 in FIG. 5. Also in this case, the determination as to whether or not the control process returns to Step S11 is effected in the same manner as in Step S18 in FIG. 5.

Further, in the above-described embodiment, the critical factor for determining the starting and ending points of the valve control operation is the value of $\Delta V$ which is calculated by subtracting 2.5 V, which corresponds to the neutral point (0 G) of transverse acceleration of the vehicle, from the output voltage V of the G sensor 39.

As described in the foregoing, according to the present invention, the direction (rightward or leftward) and magnitude (a deviation from a neutral or zero-G point) of a transverse acceleration acting on a vehicle are measured, and even if prescribed roll-controlling requirements are satisfied, roll control is stopped or prohibited when the frequency of reversal of the direction of the transverse acceleration is greater than a predetermined frequency level, as a consequence of which unstable operation or attitude of the vehicle resulting from time lags in roll-controlling operation is suppressed, thus preventing unnecessary or useless operations of suspension units and improving the durability thereof.

In addition, only the first cycle of roll-controlling operation can be carried out even if the frequency of reversal of the acceleration direction exceeds the predetermined frequency level so that any necessary operations such as a lane change, an abrupt turn in emergency situations or the like as required of the vehicle can be taken without rendering the vehicle attitude unstable.

What is claimed is:

1. A suspension control apparatus for a vehicle comprising:
    a plurality of suspension units each disposed between a road wheel and the body of a vehicle for suspending the corresponding road wheel from the vehicle body, each of said suspension units being communicated with a working fluid by corresponding valve means;
    an acceleration sensor sensing a transverse acceleration of the vehicle and providing an output signal which is representative of the sensed transverse acceleration;
    a vehicle-speed sensor sensing the speed of the vehicle and providing an output signal representative of the sensed vehicle speed;
    a steering sensor sensing the steering condition of the vehicle and providing an output signal representative of the sensed steering condition; and
    control means connected to receive the output signals from said acceleration sensor, said vehicle-speed sensor and said steering sensor for calculating the rolling state of the vehicle due to the transverse acceleration thereof and actively controlling said respective suspension units based on the calculated rolling state of the vehicle and also based on a drive time of said valve means so as to suppress the rolling of the vehicle, said control means serving to determine the frequency of change in the direction of the detected transverse acceleration of the vehicle and control said suspension units so as to stop the roll-suppression control when the frequency of change exceeds a prescribed level 2. A control apparatus for a vehicle as claimed in claim 1, wherein said control unit serves to perform the first roll-suppression control operation and stop subsequent roll-suppression control operations from the instant when the frequency of change in the direction of the transverse acceleration exceeds said prescribed level.

3. A suspension control method for a vehicle having a plurality of suspension units each disposed between a road wheel and the body of a vehicle for suspending the corresponding road wheel from the vehicle body, each of said suspension units being communicated with a working fluid by corresponding valve means, said suspension control method comprising the steps of:
sensing a transverse acceleration of the vehicle;
sensing a speed of the vehicle;
sensing a steering condition of the vehicle; and
calculating a rolling state of the vehicle due to the sensed transverse acceleration thereof and actively controlling said respective suspension units based on the calculated rolling state of the vehicle and also based on a drive time of said valve means so as to suppress the rolling of the vehicle; and
determining the frequency of change in the direction of the detected transverse acceleration of the vehicle and controlling said suspension units so as to stop the roll-suppression control when the frequency of change exceeds a prescribed level.

4. A suspension control method for a vehicle as claimed in claim 3, wherein said step of determining the frequency of change in the direction of the detected transverse acceleration of the vehicle and controlling said suspension units comprises performing the first roll-suppression control operation and then stopping subsequent roll-suppression control operations from the instant when the frequency of change in the direction of the transverse acceleration exceeds said prescribed level.

* * * * *